US008561830B2

(12) United States Patent  (10) Patent No.: US 8,561,830 B2
Hallberg  (45) Date of Patent: Oct. 22, 2013

(54) THERMAL BEVERAGE CONTAINER WITH SECURE ACCOUNT IDENTIFIER

(75) Inventor: Christopher Hallberg, Wauwatosa, WI (US)

(73) Assignee: Christopher Hallberg, Wauwatosa, WI (US)

( * ) Notice: Subject to any disclaimer, the term of this patent is extended or adjusted under 35 U.S.C. 154(b) by 461 days.

(21) Appl. No.: 12/652,899

(22) Filed: Jan. 6, 2010

(65) Prior Publication Data

US 2011/0114647 A1    May 19, 2011

Related U.S. Application Data

(60) Provisional application No. 61/145,165, filed on Jan. 16, 2009, provisional application No. 61/176,960, filed on May 11, 2009.

(51) Int. Cl.
| A47J 39/00 | (2006.01) |
| A47J 41/00 | (2006.01) |
| B65D 81/38 | (2006.01) |
| B65D 83/72 | (2006.01) |
| G06Q 20/00 | (2012.01) |

(52) U.S. Cl.
USPC .............. 220/592.17; 220/592.2; 220/592.27; 705/17

(58) Field of Classification Search
USPC ................ 220/592.17, 592.2, 592.27; 705/17
See application file for complete search history.

(56) References Cited

U.S. PATENT DOCUMENTS

| 4,301,942 A | * | 11/1981 | Kupperman et al. .... 220/592.17 |
| 6,889,455 B2 | | 5/2005 | Giraud |
| 7,624,536 B2 | * | 12/2009 | Schromm ....................... 47/66.6 |
| 8,098,162 B2 | * | 1/2012 | Abbott et al. .............. 340/572.8 |
| 2005/0087255 A1 | * | 4/2005 | Humphrey et al. ............. 141/94 |
| 2005/0099304 A1 | | 5/2005 | Humphrey |
| 2006/0102582 A1 | * | 5/2006 | Wakefield et al. ........... 215/12.1 |
| 2006/0180647 A1 | * | 8/2006 | Hansen ......................... 235/375 |
| 2007/0083381 A1 | * | 4/2007 | Farrell et al. ...................... 705/1 |
| 2009/0001177 A1 | | 1/2009 | Smith et al. |
| 2009/0212954 A1 | | 8/2009 | Adstedt et al. |
| 2010/0108755 A1 | * | 5/2010 | Fuerstenberg et al. ....... 235/375 |
| 2010/0187295 A1 | * | 7/2010 | Spivey et al. ............ 229/120.38 |

FOREIGN PATENT DOCUMENTS

KR     20-0233700     10/2001

OTHER PUBLICATIONS

Orr, Bill. 'WAVE' of the Future. Jan. 2007. American Bankers Association. ABA Banking Journal. V99n1. pp. 29-31.*
Atkinson, William. Price(y) tag: individual beverages may one day have their packaging tagged with RFID chips, opening up a whole new world of possibilities. But how long's the wait? Jul. 15, 2007. Beverage World, V 126, n 7, p. 78(2).*
Lee, E., PCT International Search Report for Application No. PCT/US2011/020645, dated Sep. 30, 2011, Korean Intellectual Property Office, Seo-gu Daejeon, Republic of Korea.

* cited by examiner

*Primary Examiner* — Scott Zare
(74) *Attorney, Agent, or Firm* — Boyle Fredrickson, S.C.

(57) ABSTRACT

A thermal beverage container provides an RFID tag anchored between dual walls of the container to be hermetically protected while scannable, thereby permitting the container to be used as a gift card to promote the use of reusable containers rather than disposable cups in the purchase of beverages.

11 Claims, 3 Drawing Sheets

THERMAL BEVERAGE CONTAINER WITH SECURE ACCOUNT IDENTIFIER

CROSS REFERENCE TO RELATED APPLICATION

This application claims the benefit of U.S. provisional application 61/145,165 filed Jan. 16, 2009 and the benefit of U.S. provisional application 61/176,960 filed May 11, 2009 both hereby incorporated by reference.

BACKGROUND OF THE INVENTION

The present invention relates to a reusable thermal beverage container, for example, suitable for coffee, providing a secure account identifier permitting the container to be used like a gift card.

Disposable coffee cups present a burden to landfills. By some estimates Americans use 23 billion disposable coffee cups per year. Conventional polystyrene foam disposable cups are lightweight and provide for good thermal insulation but are not typically recycled and are not biodegradable. Disposable paper cups can be biodegradable but often cannot be recycled because of plastic resins used to control liquid absorbency on the cup surface. Further, paper cups generally incorporate only small amounts of recycled paper because of concerns about allowing recycled paper to come into contact with food and beverages and because of problems with strength. Paper cups, particularly when used with insulating sleeves, present significant costs in water, energy, trees and landfill space.

A simple solution to the problems presented by disposable coffee cups is the use of a reusable thermal mug. The manufacture of such reusable mugs also presents environmental costs, but these are costs are typically outweighed by the savings so long as the mug is consistently reused in lieu of disposable cups.

Reusable mugs are often not reused when coffee is purchased at a retail provider. Attempts to encourage such reuse often consider providing a monetary incentive to the purchaser who does not use a disposable cup. Unfortunately although the cumulative societal benefit of avoiding disposable cups is large, on an individual basis, the cost savings to the retailer are only a few cents, an amount that may be insufficient to provide the desired motivation. Retailers are understandably reluctant to impose a higher, punitive incentive payment on customers that might drive away customers.

SUMMARY OF THE INVENTION

The present invention provides a thermal beverage container that may act like a gift card, holding a balance that may be used for the purchase of coffee or the like. By providing an additional benefit to the consumer in using the container (initially in the form of an account balance that is often a gift, and later in the form of a convenient method of purchasing a beverage) the reuse of the container may be encouraged independent of, or in addition to, other incentive payments or programs. In one embodiment, the present invention provides a simple method of incorporating an RFID tag into a container by the insertion of the tag between the walls of a dual walled thermal beverage container where it is protected from damage and tampering while maintaining ready access for scanning. The RFID tag contains the information needed for the gift card function and may provide for useful data to link the consumer to incentives, for example, a tallying of the total number of disposable cups eliminated by the consumer or consumers as a group.

Specifically, the present invention provides a thermal beverage container constructed of an outer cup having a side wall extending upward from a bottom wall to an upper periphery and an inner cup having a side wall extending upward from a bottom wall to an upper periphery, the latter sealed to the upper periphery of the outer cup to define a volume between the inner cup and outer cup. An RFID tag is anchored against movement within the sealed volume at a predetermined location identifiable by a user of the thermal beverage container.

It is thus a feature of at least one embodiment of the invention to provide a readily manufactured thermal beverage container that can be used to promote an environmentally beneficial reduction in the use of disposable cups. By placing an RFID tag in between the walls of the beverage container, the electronics of the tag may be shielded from the environmental stress of heat, moisture and abrasion while permitting ready access for scanning. Using a double walled container design makes it possible to integrate an RFID tag into a pre-existing cup design using conventional manufacturing techniques, eliminating the need for costly and specialized tooling or manufacturing equipment.

The thermal beverage container may include a sheet formed in a sleeve and fitting within the sealed volume coaxially about the side wall of the inner cup to be substantially retained against movement therein and the RFID tag maybe anchored to the sleeve.

It is thus a feature of at least one embodiment of the invention to provide a simple method of anchoring the RFID tag with respect to the cup for reliable scanning. Attaching the RFID tag to the sheet permits the use of existing manufacturing equipment to place such liners into thermal double-walled cups and to attach RFID tags to sheets. In another embodiment the RFID tag can be manufactured into the paper sleeve itself, further enhancing assembly efficiency.

The RFID tag maybe anchored to an inner side of the sleeve between the sleeve and the side wall of the inner cup. The inner cup may be opaque.

It is thus a feature of at least one embodiment of the invention to remove the RFID tag from view for aesthetic and security purposes.

The sheet may be printed on an outer surface with indicia indicating the predetermined location. It is thus a feature of at least one embodiment of the invention to provide an intuitive method of encouraging the consumer to correctly orient the container for RFID scanning.

The outer cup may be light transmissive allowing the predetermined location of the RFID tag to be identified visually by the user looking through the outer cup.

It is thus a feature of at least one embodiment of the invention to accommodate the competing concerns of protecting the RFID tag from damage and tampering, and promoting proper alignment of the tag with a reader.

The outer cup may be formed of a substantially constant thickness material of uniform strength without a predefined user frangible portion.

It is thus a feature of at least one embodiment of the invention to resist tampering with the RFID tag to provide a secure payment system.

The thermal beverage container may further include a lid sealably interfitting with an upper lip of at least one of the inner and outer cups to enclose a volume within the inner cup.

It is thus a feature of at least one embodiment of the invention to integrate an RFID tag into a conventional full-featured beverage container.
}

The invention contemplates the use of a plurality of beverage containers as described above with at least one RFID tag reader communicating with a point of sale terminal for reading RFID tags to obtain secure account information indicating a payment source for a purchase recorded by the point of sale terminal. An account database may link the secure account information to account balances, and an electronic program executing on an electronic computer, for example, in at least one of the RFID tag reader and point-of-sale terminals and communicating with the account database, may apply a charge for the purchase against an account balance linked to a secure account information associated with the RFID tag of the thermal beverage container.

It is thus a feature of at least one embodiment of the invention to provide a convenience of a gift card in the form factor of a beverage container.

The above system may further include a Web server communicating with the account database to tally and present on the web an indication of resources saved as a function of charges against account balances. Alternatively or in addition, an electronic display proximate to the point-of-sale terminal may provide a real time indication of resources saved as a function of charges against at least some account balances.

It is thus a feature of at least one embodiment of the invention to promote reusable beverage containers by providing a real time indication of the effect of many individuals working in cooperation to reduce the use of disposable cups.

These particular objects and advantages may apply to only some embodiments falling within the claims and thus do not define the scope of the invention.

DETAILED DESCRIPTION OF THE PREFERRED EMBODIMENT

Figure 1:
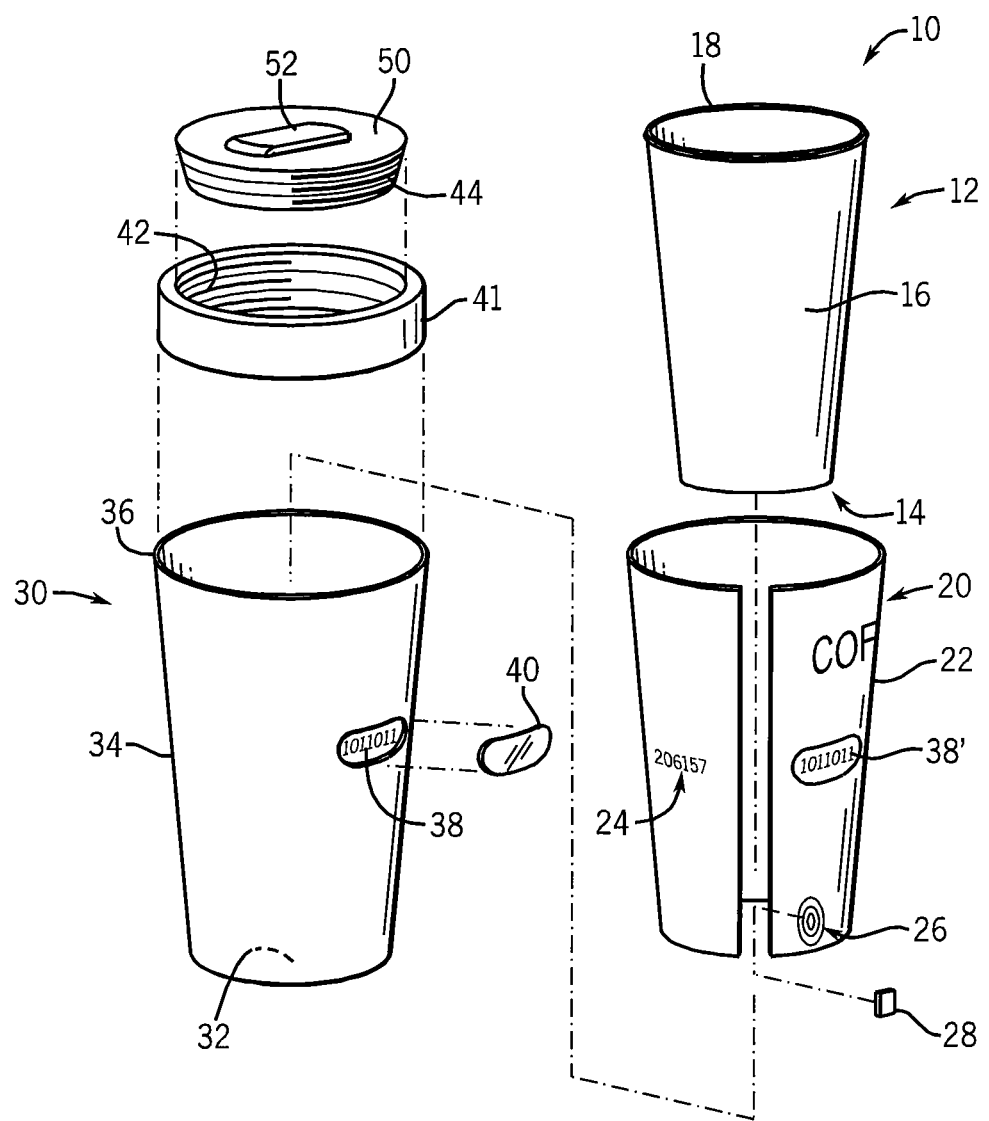
FIG. 1 is an exploded view of a first embodiment of the beverage container of the present invention having a double walled design.

Referring now to FIG. 1, in a first embodiment, a thermal beverage container 10 may provide an inner cup 12 having a lower circular base 14 and upstanding frustro-conical sidewalls 16 leading to an upper peripheral rim 18. In one embodiment, the inner cup 12 may be constructed of an opaque thermoplastic suitable for injection molding or other forming techniques.

A paper insert 20 wraps about the outside of the sidewalls 16 as may be rolled from a planar sheet diecut in a sector of annulus to conform to sidewalls 16. Opposed edges of the paper insert 20 may be sealed together or may be retained in close proximity by their assembly within the beverage container 10 as will be described. An outer surface of the paper insert 20 facing away from the sidewalls 16 may be printed, for example, with marketing material 22, an optional account and/or web site identifier 24, and a scan target 26 indicating to the consumer a point on the beverage container 10 that should be placed adjacent to an RFID reader when the beverage container 10 is to be used as a gift card.

An RFID tag 28 attaches to an inner surface of the paper insert 20 behind the scan target 26 by an adhesive label or other means. It will be understood that this assembly of the RFID tag 28 to the paper insert 20 may occur while the paper insert 20 is in flat form and possibly before die cutting so that high speed paper handling and transfer techniques may be used, for example, transferring RFID tags 28 from a tape reel to a printed paper web. The RFID tag 28 may, for example, be an NXP Semiconductor Mifare line that complies with ISO 14443-A standards and communicates at 13.56 MHz or the Texas Instruments Tag-It line, ISO 15693 communicating at 13.56 MHz as well. It will be appreciated that in alternate embodiments the RFID tag 28 may be attached to the outside of the paper insert 20 or to other components of the beverage container 10.

The inner cup 12 and paper insert 20, as assembled together, may be fit within an outer cup 30 of similar construction to inner cup 12, the outer cup 30 having a lower circular base 32 with upstanding sidewalls 34 leading to an upper peripheral rim 36. The volume contained by the outer cup 30 is larger than that contained by the inner cup 12 to accommodate the paper insert 20 between inner cup 12 and outer cup 30 when the inner cup 12 is placed coaxially within outer cup 30 and to provide for an insulating air gap. Outer cup 30 is preferably constructed of a transparent or translucent thermoplastic suitable for injection molding or the like and may optionally include a printed activation code 38 on its outer or inner surface temporarily obscured with a tag or removable "scratch-off" paint providing a cover 40. Alternatively, the activation code 38' may be positioned on the paper insert 20 for ease of manufacture. This activation code 38 may, for example, be a sequential or randomly generated number that may be keyed to a corresponding number on the RFID tag 28. The activation code 38 permits the beverage container 10 to be retained on display before investing the beverage container 10 with gift card value. Upon purchase, the beverage container 10 is activated to have value, by modification of an external database to be described. The combination of the activation code 38 and the number of the account and/or web site identifier 24 provides great flexibility in managing activation of the RFID tag and managing the underlying account in a manner well known in the art of gift cards. It will be appreciated that activation code 38, the account number and/or web site identifier 24 and scan target 26 could be printed directly on RFID tag 28 to allow for higher efficiency manufacturing processes.

The upper rims 18 and 36 of inner cup 12 and outer cup 30, when nested together, may be sealed to a rim ring 41, for example, by ultrasonic or spin welding, adhesive, a threaded joint or other means to define a sealed volume between outer cup 30 and inner cup 12 containing the paper insert 20. It will be understood that this volume provides a thermal barrier promoting reduced heat flow through the sidewalls 16 and 34 such as it may improve heat retention for hot beverages while preserving cold beverages against environmental heating. The sealed volume will typically be sealed against both airflow and water flow, the latter permitting ready washing of the beverage container by the consumer without damage to the insert 20 or RFID tag 28. The size of the inner sealed volume is such as to restrict movement of the paper insert 20 thereby stabilizing the RFID tag 28 by effectively anchoring it within the beverage container 10 for reliable scanning.

The rim ring 41 may provide for an inner threaded portion 42 engaging corresponding outer threads 44 of a lid 50 having, for example, a travel spout 52 of the type well known in the art. It will be understood that other means of attaching the lid 50 to the rim ring 41, such as a snap fit may also be employed as is understood in the art. The lid 50 provides a second sealed volume within the upstanding sidewalls 16 of the beverage container 10 for holding a beverage without spilling. It will be understood that the rim ring 41 may be formed as an integral part of either of the inner cup 12 or outer cup 30 to provide simplified manufacturing.

Figure 2:
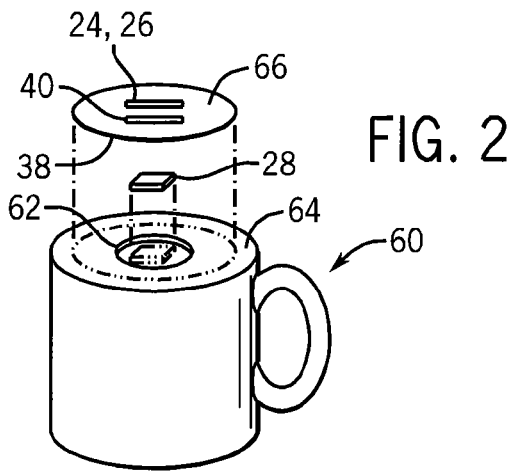
FIG. 2 is a figure similar to that of FIG. 1 showing an alternative design employing a solid ceramic mug.

Referring now to FIG. 2, in an alternative embodiment, a ceramic or one-piece beverage container 60 may have an RFID tag 28 placed in a shallow depression 62 at a bottom 64 of the beverage container 60 and covered with a transparent protective disk 66 by adhesive or the like. The disk 66 may include the activation code 38 printed on an inner surface toward the beverage container 60, likewise the account and/or web site identifier 24 and scan target 26. A cover 40 may be applied to the outer surface over the activation code 38 for removal by the consumer.

Figure 3:
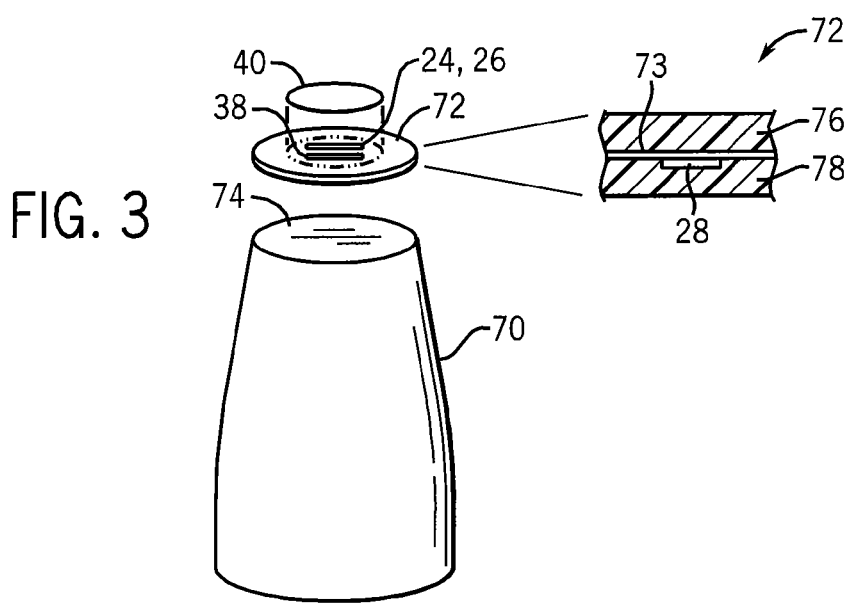
FIG. 3 is a figure similar to that of FIGS. 1 and 2 showing an alternative design employing a stainless steel mug whose metallic walls can interfere with RFID scanning, further showing a cross-sectional pad attached to the bottom of the mug.

Referring now to FIG. 3, an alternative design may be used for a metallic beverage container 70, for example, a stainless steel container. It has been determined that the metallic container walls can interfere if the scanning of the RFID tag 28 and, accordingly, the RFID tag 28 may be embedded in a nonmetallic disc 72 so as to be spaced from a bottom 74 of the beverage container 70 while attached to that bottom 74. The nonmetallic disc 72 may be constructed of two laminated transparent disks 76 and 78 preferably constructed of a transparent elastic material providing cushioning grip to the bottom of the beverage container 70. The RFID tag 28 may be attached to a card 73 embedded between these laminations and the card 73 printed with the activation code 38 and account and/or web site identifier 24 and scan target 26 the former shielded by cover 40.

Figure 4:
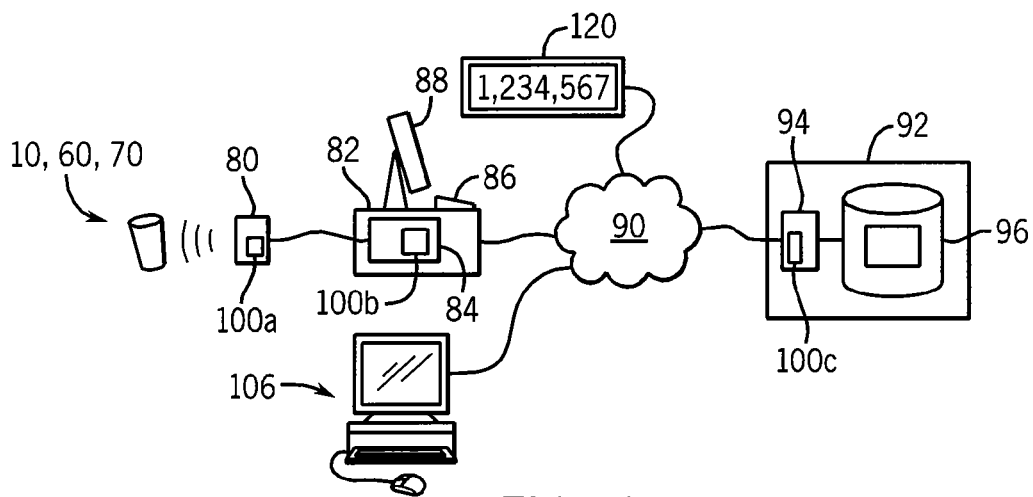
FIG. 4 is a block diagram of a retail system having a point-of-sale terminal system and RFID tag reader for use with the beverage container of FIGS. 1-3.

Referring now to FIG. 4, the beverage containers 10, 60, 70, in use in a retail establishment, may be scanned by an RFID reader 80 communicating electronically with a point-of-sale terminal 82 operating as a cash register. The type of reader 80 used will depend on the type of RFID tag 28 used. Commercially available readers 80 suitable for use with the present invention include the VivoTech VivoPay 4500, the AceProx 738-52 Keyboard Wedge, the RFIDeas Air ID Enroll, or the Stronglink SL502.

The point-of-sale terminal 82 will generally provide for a processor 84, a keyboard 86, and a display screen 88, of the type known in the art. In a preferred embodiment, the point-of-sale terminal 82 may communicate over the Internet 90 with a Web server 92 having a processor 94 and a mass storage device 96 implementing a database as will be described. Alternatively, the database may be held on a wide area network or locally within the retail establishment.

A stored program 100 executing optionally as one or more portions 100a on the reader 80 and 100b, on the point-of-sale terminal 82 and 100c, or on the processor 94 of the Web server 92, may permit the consumer to use the beverage container 10, 60, 70 to authorize purchases against pre-paid account balances.

Figure 5:
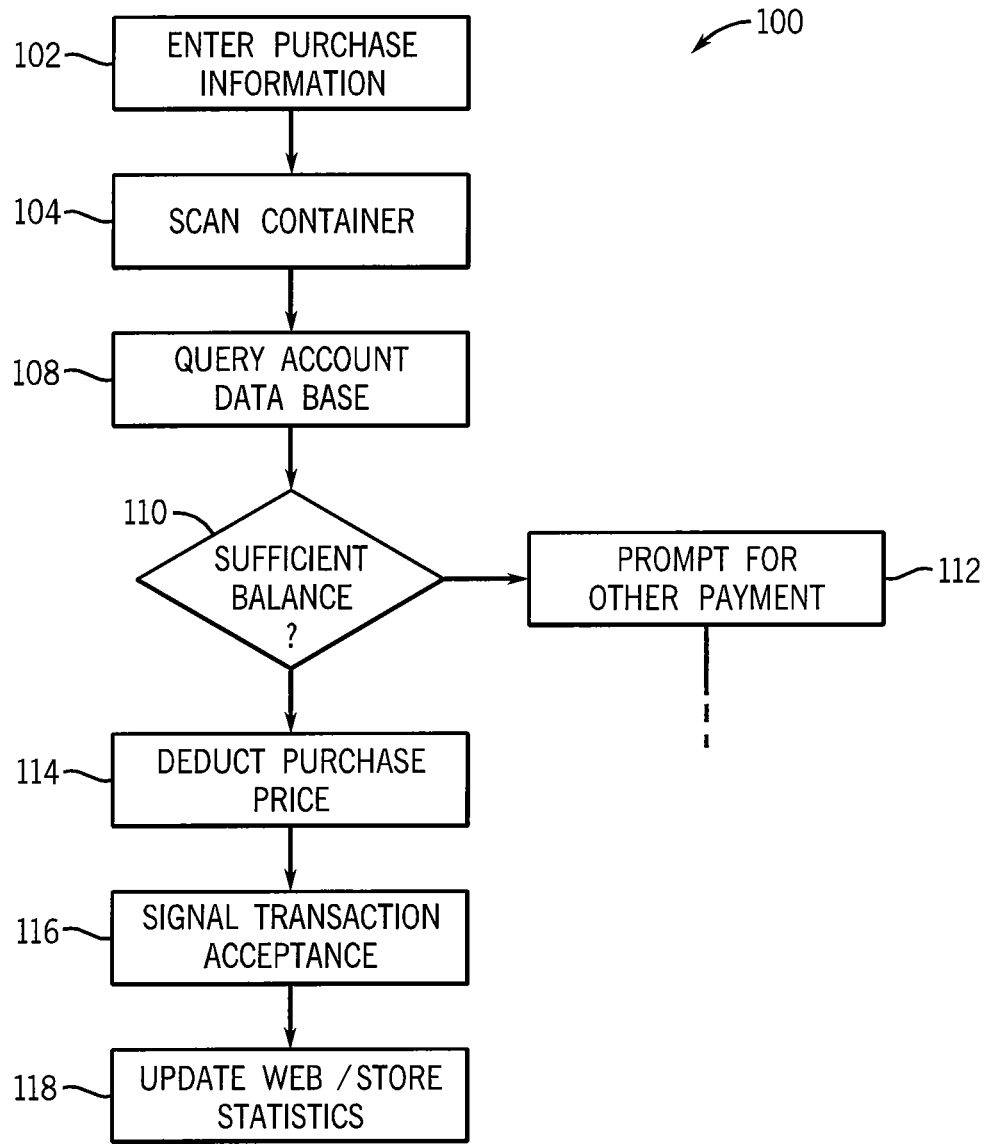
FIG. 5 is a flow chart of a program running, for example, on the point-of-sale terminal or reader and communicating with a remote database to implement additional consumer incentives for reuse of the beverage container.

Referring now to FIGS. 4 and 5, in a typical transaction sequence the customer selects a beverage for purchase and offers a beverage container 10, 60, 70 to be used instead of a disposable cup. Information identifying the purchase, for example the beverage type and amount, is entered into the point-of-sale terminal 82 as indicated by process block 102.

At a transaction stage where payment must be presented, the beverage container 10, 60, 70 is placed near the reader 80 for scanning per process block 104 by bringing the RFID tag 28 within approximately 1 inch of the reader 80.

The reader 80 reads a unique identification number (UID) from the RFID tag 28 which is transmitted to the point-of-sale terminal 82 and optionally over the Internet 90 to the Web server 92. The UID provides a secure account identifier that may be matched to a particular account stored on the database in the mass storage device 96 as indicated by process block 108, the database identifying a balance of money associated with that particular RFID tag 28. Typically this balance is established when the beverage container 10, 60, 70 is purchased, for example, in the manner of a gift card but this amount may be updated through the point-of-sale terminal 82 (in which case an alternative payment form, for example, a credit card or gift card is used) or by means of a remote terminal 106 accessing the web site provided by the web site identifier 24, for example, under the control of the consumer who augments this balance using a credit card or the like for an online transaction. As an alternative to using the UID, an account number corresponding to an account in mass storage device 96 database could be securely encoded to the RFID tag's memory using industry standard encryption techniques.

As indicated by decision block 110, if the balance identified to the secure account identifier is insufficient for the particular purchase, the program 100 proceeds to process block 112 and any balance in the identified account may be applied to the purchase and an alternative payment methods requested per a message output to the display screen 88 of the point-of-sale terminal. The output information may also provide a current balance number for the consumer. At this time additional money may be added to the balance as described above or an alternative form of payment made.

If at decision block 110, the balance is sufficient for the entered purchase, a deduction for the purchase is made from that balance as indicated by process block 114 and a process block 116 acceptance of the transaction is indicated, for example, by the printing of a receipt.

At process block 118, information from the transaction may be used to update a tally of purchases using the beverage container 10, 60, 70 that may be used to generate statistics of resources (for example disposable cups) saved by the reuse. These resources saved may be stored in the database in the mass storage device 96 on a per customer basis to be visible by the customer using standard Web browser on terminal 106 as well as printed on the customer's receipt. This stored information may indicate the customer's lifetime resource savings through use of the beverage container 10, 60, 70 and/or provide other statistical information about their purchases.

Alternatively or in addition, an electronic display 120 may be provided in the retail establishment that indicates a cumulative resources saved, for example, by all customers, and incremented with an audible signal at the time of purchase. In this way, the customer using the beverage container 10, 60, 70 and other customers in the vicinity may be encouraged by the understanding of the benefit produced by many individuals independently working toward a common goal. The display may show all or one of total purchases for a particular period of time, purchases by the individual cumulatively, or for a particular period of time, dollars of resources saved or other measures of the impact of reusing the beverage container 10, 60, 70.

It will be understood that the use of the database on the mass storage device 96 may permit the value of a given beverage container 10, 60, 70 to be voided or invalidated in the event of loss or theft and allow the customer to view the remaining account balance, add to the balance, and transfer the balance to a new container. The database may be used to collect information for marketing or customer loyalty programs recording, for example, types of beverage purchased, times purchased, purchase locations, etc. Customers may have the ability to register their mugs online or over the phone and may create accounts identified by e-mail address and protected by a password also managed by the database on the mass storage device 96. During the registration, process the customer may provide demographic information, for example name, age, gender, address, phone number, and other marketing information.

The web site can provide a number of other features that encourage use of the reusable beverage container 10, 60, 70. These features may include allowing the customer to view progress towards customer loyalty promotions (for example, a free coffee beverage after purchasing ten beverages or free 1 pound of coffee beans for visiting each store in of a small chain), it would allow customers to purchase beverage container 10, 60, 70 or add money to such containers to be delivered to a friend over email or SMS text message. Customers could set a "usual" beverage that would appear on the POS terminal such that they simply need to ask for "the usual" when purchasing their favorite beverage. This would allow for the creation of a cashless "express lane" where frequent customers would simply place their mug on the counter and then pick it up when the beverage was ready. Customers could elect to have their first names shown on the cashier's display, allowing for more personalized service. Free coffee could be offered to customers on their birthdays. As the database records the different purchases over time, a backend software application could make "intelligent" recommendations based on each customer's purchase history that would appear on the POS terminal for the cashier to suggest to the customer. Customers could purchase coffee subscriptions on a weekly, monthly, or yearly basis. These subscriptions would allow customers to obtain a certain quantity of beverages for a set price over a stipulated period of time. For example, a weekly subscription may include one espresso beverage each weekday for at a weekly rate. Customers' accounts could be attached to a credit card so that subscriptions could be renewed automatically or so that a balance would be added to the mug periodically or when the mug balance falls below a set level. Food service store operators can generate custom reports and offer customized promotions based on demographics, purchase history, or a combination of the two, through a web-based interface. It should be noted that the cup may be used to purchase other items within a retail establishment simply in the manner of a gift card without the purchase of a beverage. In certain applications it may be possible to substitute magnetic stripes or optical bar codes for the RFID tag.

It is specifically intended that the present invention not be limited to the embodiments and illustrations contained herein and the claims should be understood to include modified forms of those embodiments including portions of the embodiments and combinations of elements of different embodiments as come within the scope of the following claims.

What I claim is:

1. A thermal beverage container comprising:
    an outer cup having a side wall extending upward from a bottom wall to an upper periphery;
    an inner cup having a side wall extending upward from a bottom wall to an upper periphery sealed to the upper periphery of the outer cup to define therebetween a sealed volume between the inner cup and outer cup the sidewall of the inner cup being spaced from the side wall of the outer cup, and the bottom wall of the inner cup being spaced from the bottom wall of the outer cup, to provide a substantially continuous insulating air gap between the outer cup and the inner cup; and
    an RFID tag anchored against movement within the sealed volume of the insulating air gap at a predetermined location identifiable by a user of the thermal beverage container.

2. The thermal beverage container of claim 1 further including a sheet formed in a sleeve and fitting within the sealed volume coaxially about the side wall of the inner cup to be substantially retained against movement therein; and
    wherein the RFID tag is anchored to the sleeve.

3. The thermal beverage container of claim 2 wherein RFID tag is anchored to an inner side of the sleeve between the sleeve and the side wall of the inner cup.

4. The thermal beverage container of claim 3 wherein the inner cup is opaque.

5. The thermal beverage container of claim 2 wherein the sheet is printed on an outer surface with indicia indicating the predetermined location.

6. The thermal beverage container of claim 1 wherein the outer cup is light transmissive allowing the predetermined location of the RFID tag to be identified visually by the user looking through the outer cup.

7. The thermal beverage container of claim 1 wherein the outer cup is formed of a substantially constant thickness material of uniform strength without a predefined user frangible portion.

8. The thermal beverage container of claim 1 further including a lid sealably interfitting with an upper lip of at least one of the inner and outer cups to enclose a volume within the inner cup.

9. A reusable beverage container system comprising:
    a plurality of thermal beverage containers each comprising:
    (i) an outer cup having a side wall extending upward from a bottom wall to an upper lip;
    (ii) an inner cup having a side wall extending upward from a bottom wall to an upper lip joined to an upper lip of the outer cup to define a sealed volume between the inner cup and outer cup, the sidewall of the inner cup being spaced from the side wall of the outer cup, and the bottom wall of the inner cup being spaced from the bottom wall of the outer cup, to provide a substantially continuous insulating air gap between the outer cup and the inner cup;
    (iii) an RFID tag anchored against movement within the sealed volume of the air gap at a predetermined location identifiable by a user of the thermal beverage container, the RFID tags associated with unique account numbers;
    at least one RFID tag reader communicating with a point of sale terminal for reading RFID tags to obtain secure account information indicating a payment source for a purchase recorded by the point of sale terminal;
    an account database linking the secure account information to account balances;
    an electronic program executing on at least one electronic computer and communicating with the account database to apply a charge for the purchase against an account balance linked to secure account information associated with the RFID tag of the thermal beverage container.

10. The thermal beverage container of claim 9 further including a Web server communicating with the account database to tally and present on the web an indication of resources saved as a function of charges against account balances.

11. The thermal beverage container of claim 9 further including an electronic display proximate to the point of sale terminal providing a real time indication of resources saved as a function of charges against at least some account balances.

* * * * *